Sept. 30, 1952 C. W. CLAPP 2,612,604

ELECTRONIC TIME DELAY CIRCUIT

Filed Feb. 25, 1948

Inventor:
Charles W. Clapp,
by Brownell S. Mack
His Attorney.

Patented Sept. 30, 1952

2,612,604

UNITED STATES PATENT OFFICE 2,612,604

ELECTRONIC TIME DELAY CIRCUIT

Charles W. Clapp, Schenectady, N. Y., assignor to General Electric Company, a corporation of New York Application February 25, 1948, Serial No. 10,742

10 Claims. (Cl. 250—27)

My invention relates to electronic time delay circuits, and its object is to provide an improved time delay circuit having a relatively large time constant while using small inexpensive circuit elements. Such circuits have many uses: for example, in providing automatic drift compensation for a bridge-type metal detector, it is necessary that the rebalancing mechanism respond to any bridge unbalance conditions due to slow drift, and not respond to transient unbalance conditions due to presence of the metal to be detected. This may be accomplished by passing the bridge unbalance signals through a delay circuit having a sufficiently large time constant to greatly attenuate the short-duration transient unbalance signals, with relatively small attenuation of long-duration unbalance signals due to drift. In some applications time constants of 400 seconds or more are desirable. To obtain such a large time constant with a conventional resistance-capacitance, or RC, circuit requires large, bulky, and expensive capacitors and resistors.

Figure 1:
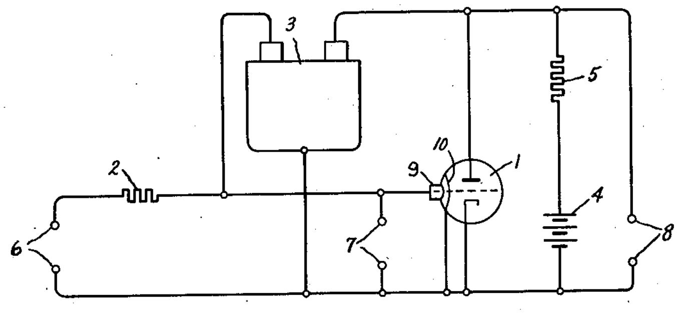
Figure 2:
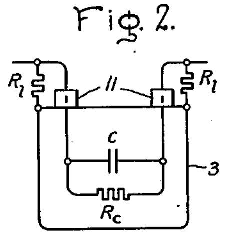
Figure 3:
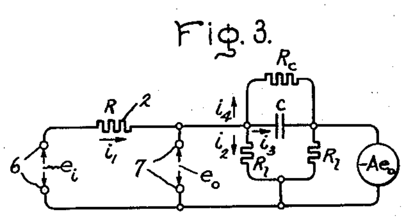
Figure 4:
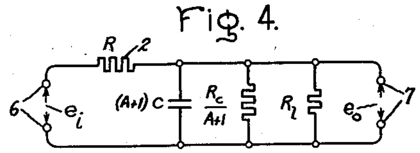

The features of my invention which are believed to be novel and patentable are pointed out in the claims appended hereto. For a better understanding of my invention, reference is made in the following description to the accompanying drawing in which Fig. 1 is a schematic diagram of a preferred embodiment of my invention; Fig. 2 is a diagram showing the inherent leakage resistances of capacitor 3, Fig. 1; and Figs. 3 and 4 are equivalent circuits of the electrical circuit of Fig. 1. Like reference characters refer to like parts throughout the drawing.

Referring now to Fig. 1, I have shown an electronic time delay circuit having a vacuum tube 1, a resistor 2 with one of its terminals connected to the control grid of vacuum tube 1, a capacitor 3 connected between the control grid and the anode of vacuum tube 1, a voltage source 4 and a load resistor 5 for operatively energizing vacuum tube 1 as a voltage amplifier, input terminals 6, and output terminals 7 and 8. Vacuum tube 1, voltage source 4, and load resistor 5 constitute a three-terminal voltage amplifier.

Vacuum tube 1 is shown as a triode but may be any other type of vacuum tube suitable for use in a vacuum tube voltage amplifier. Tube 1 is preferably of the type having its control grid connected to a separate grid cap 9 for reasons which are hereinafter explained. Preferably, a guard ring 10, which may be a small circle of carbon paint or other electrically conducting material applied to the envelope of tube 1, surrounds grid cap 9 as shown and is connected to the cathode of vacuum tube 1.

Capacitor 3 is of a type designed to have a very high leakage resistance, and is enclosed in an electrically conducting metal can. This can is connected to the cathode of vacuum tube 1 for reasons hereinafter explained.

The input voltage is applied to my circuit across terminals 6. The delayed output voltage may be taken off either at terminals 7 or at terminals 8, alternately. The voltage change at terminals 8 is identical to that at terminals 7, except that its magnitude is multiplied by the voltage gain of vacuum tube 1 and its sign is reversed.

In a conventional RC time-delay circuit, a capacitor is charged by current flowing through a resistor. Since the capacitor voltage rises exponentially, and theoretically approaches but never quite reaches a final, steady-state value, the time constant T has been defined as the time required for the capacitor voltage to reach a value of $$1-\frac{1}{e}$$

or about 63%, times the steady-state value, where $e$ is the base of natural logarithms. In a simple RC circuit, this time constant T, in seconds, is numerically equal to the product of the resistance R, in ohms, and the capacitance C, in farads, of the circuit. For example, a resistance of 4 megohms and a capacitance of 2 microfarads yield a time constant of 8 seconds. Thus, if one volt is applied to the input of such a circuit, there will be a delay of 8 seconds before the output voltage reaches 0.63 volt. If a relay responsive only to voltages equal to or exceeding 0.63 volt is attached to the output of such a circuit, 1 volt signals applied to the input of the circuit will energize the relay only if they have a duration of 8 seconds or more.

In the type circuit shown in Fig. 1, the capacitor must be charged to a much higher voltage, since the voltage across capacitor 3 is multiplied by one plus the voltage gain of the amplifier including vacuum tube 1. But since the charging current must still flow through resistor 2, and is limited in magnitude by the value of this resistor, it takes a much longer time to charge capacitor 3 to the higher voltage required. Except for the effects of leakage resistance, hereinafter discussed, it would be possible in this manner to multiply the time constant by the voltage gain of the amplifier plus 1, so that with a 4 megohm resistor and a 2 microfarad capacitor, as before, together with an amplifier having a voltage gain of 50, a time constant of 408 seconds could be obtained.

Referring now to Fig. 2, I have shown capacitor 3 with its inherent leakage resistances. The capacitance C represents the pure capacitance of the capacitor between its two terminals. Resistance $R_c$ is the leakage resistance through the dielectric of the capacitor, and the two resistances $R_1$ represent leakage resistances across insulating bushings 11 from the respective capacitor terminals to the metal can of the capacitor.

Fig. 3 is an equivalent circuit of the electrical circuit of Fig. 1, in which capacitor 3 has been replaced by its equivalent capacitance and resistances as shown in Fig. 2, and the amplifier including vacuum tube 1 has been replaced by an equivalent voltage $-Ae_0$. The input voltage applied to terminals 6 is represented by $e_i$, and the output voltage at terminals 7 is represented by $e_0$. The voltage gain of vacuum tube 1 is represented by A, and the phase reversal of the vacuum tube amplifier is represented by placing a minus sign before A. The resistance of resistor 2 is represented by R. The currents in respective circuit loops are represented by $i$'s.

By writing equations for the voltages around respective circuit loops of the circuit shown in Fig. 3, we obtain the following:

$$Ri_1+R_1i_2=e_i$$

$$Ri_1+\frac{1}{C}\int i_3dt=e_i+Ae_0$$

$$Ri_1+R_ci_4=e_1+Ae_0$$

$$R_1i_2=e_0$$

It is also evident that:

$$i_1=i_2+i_3+i_4$$

When solved simultaneously, these equations give a solution of the form $$e_0=Ke^{-\frac{t}{T}}+f(e_i)$$

where $$T=\frac{(A+1)RC}{1+\frac{R}{R_1}+(A+1)\frac{R}{R_c}}$$

Now, if $$R_1\gg R\ll\frac{R_c}{A+1}$$

$$T\simeq(A+1)RC$$

In these equations, T is the time constant of the electrical circuit as previously defined, $t$ represents time in seconds, K is a constant depending upon initial circuit conditions, and $f(e_1)$ is a steady-state function of the input voltage. It is thus seen that with my circuit a time constant is obtained which is approximately $A+1$ times as large as the normal RC time constant obtainable with the resistor and capacitor used, as previously explained. However, to obtain the full benefit of this increased time constant, it is necessary that both $R_1$ and $R_c$ be kept large with respect to R. Of these two, the most critical is $R_c$ since it is effectively divided by the factor $A+1$. Thus it is important that a very large value of $R_c$ be obtained. It is evident that the final time constant can be no larger than the $R_cC$ time constant of the capacitor itself. It can be seen from the equations that the circuit of Fig. 4 is also equivalent to the circuits of Fig. 1 and Fig. 3. Fig. 4 clearly illustrates the relative effect of resistances $R_c$ and $R_1$ in lowering the effective time constant of the circuit.

Capacitors having a high leakage resistance $R_c$ through the dielectric material are commercially available in small sizes at reasonable prices. These capacitors are commonly enclosed in metal cans and the terminals are insulated from the can by insulating bushings. It has been found that in such small commercial capacitors the leakage resistance $R_1$ from the terminals to the can across the bushings may be much smaller than the leakage resistance $R_c$ through the dielectric material, especially if the circuit must be operated in moist atmospheres.

Referring to Fig. 3, it should be noted that in my circuit one of the resistances $R_1$ effectively appears across the output of vacuum tube 1 and so has little, if any, effect upon the time constant obtained. The other $R_1$ effectively is connected between grid and cathode of the vacuum tube and so has a relatively small effect upon the time constant. If the capacitor can were not connected to the cathode as I have shown, the two resistances $R_1$ in series would be effectively connected in parallel with capacitance C, and so would have a very much larger effect upon the time constant since their value would then be divided by the factor $A+1$, as occurs in the case of $R_c$. I have found that by connecting the capacitor can to the cathode I may increase the time constant of my circuit by as much as a factor of 10.

From the above analysis it is evident that in this type of circuit a larger effective leakage resistance between capacitor terminals is obtained by using a capacitor in a metal can and connecting the can to the vacuum tube cathode than would be possible by following the conventional design practice, where large leakage resistance is desired, of using a capacitor in a container of paper or other insulating material mounted upon insulating supports. The metal can is advantageous because it provides a conducting member, connected to the vacuum tube cathode, between the capacitor terminals, and thus prevents conduction between the capacitor terminals along the outside surface of the capacitor. It will be evident to those skilled in the art that, as an alternative, a paper type capacitor may be used in carrying out this invention, provided a guard ring of conducting material is placed around the surface of the capacitor between its terminals, and the guard ring is connected to the vacuum tube cathodes. When this is done, the guard ring serves the same purpose as the metal can in the embodiment previously described.

It is evident that a similar problem arises from the leakage resistances between terminals of vacuum tube 1. Of these resistances, the most troublesome by far is that from the control grid to the anode, since this resistance directly connecting the output of the voltage amplifier to its input is in parallel with $R_c$ and hence is effectively divided by the factor $A+1$, as previously explained. To reduce the effect of this resistance to as low a value as possible, it is desirable that a vacuum tube be selected which has its control grid connected to a separate grid cap mounted on a glass envelope. A guard ring may then be placed in position on the tube envelope surrounding the grid cap, as previously described, and connected to the cathode of the vacuum tube. Thus any leakage paths from the control grid will end at the guard ring, and thus will appear in the circuit between grid and cathode where they are least objectionable since not divided by the factor $A+1$. It is evident that the same result can be obtained by choosing a tube having its anode connected to a separate cap on the glass envelope, and that the guard ring may be placed in any position which will isolate the control grid and anode terminals.

In accordance with the provisions of the Patent Statutes, I have described the principle of my invention, together with the apparatus which I now consider to represent the best embodiment thereof; but I wish it to be understood that the apparatus described is illustrative only, and that the invention can be carried out by other means.

What I claim as new and desire to secure by Letters Patent of the United States is:

1. In a time-delay circuit including a three-terminal voltage amplifier, a capacitor connected between the input and output terminals of the amplifier, said capacitor having an electrically conducting member secured thereto adjacent to and separated from its terminals, said conducting member being connected to the amplifier terminal common to both input and output.

2. In a time-delay circuit including a three-terminal voltage amplifier, a capacitor connected between the input and output terminals of the amplifier, said capacitor being enclosed in an electrically conducting can connected to the amplifier terminal common to both input and output.

3. An electronic time-delay circuit comprising a voltage amplifier including a vacuum tube having a cathode, a control grid, and an anode, a resistor connected at one of its terminals to said control grid, and a capacitor connected between said control grid and said anode, said capacitor having an electrically conducting member secured thereto adjacent its terminals, said conducting member being separated from the terminals of said capacitor and being connected to said cathode.

4. An electronic time-delay circuit comprising a voltage amplifier including a vacuum tube having a cathode, a control grid, and an anode, a resistor connected at one of its terminals to said control grid, and a capacitor connected between said control grid and said anode, said capacitor being enclosed in an electrically conducting can connected to said cathode.

5. An electronic time-delay circuit comprising a voltage amplifier including a vacuum tube having cathode, control grid, and anode electrodes, said vacuum tube being of the glass envelope type having a terminal connected to its cathode and having terminals, at least one of which is a separate cap located on the glass envelope, respectively connected to its control grid and its anode, a resistor connected at one of its terminals to the control grid, and a capacitor connected between said control grid and said anode, said capacitor being enclosed in an electrically conducting can connected to said cathode.

6. An electronic time-delay circuit comprising a voltage amplifier including a vacuum tube having cathode, control grid, and anode electrodes, said vacuum tube being of the glass envelope type having a terminal connected to its cathode and having terminals, at least one of which is a separate cap located on the glass envelope, respectively connected to its control grid and its anode, a guard ring of electrically conducting material on the surface of the glass envelope electrically separating the control grid terminal from the anode terminal, said guard ring being connected to said cathode, a resistor connected at one of its terminals to said control grid, and a capacitor connected between said control grid and said anode.

7. An electronic time-delay circuit comprising a voltage amplifier including a vacuum tube having a cathode, a control grid with a grid cap connected thereto, and an anode, said vacuum tube being of the glass envelope type with the grid cap located on the glass envelope, a resistor connected at one of its terminals to said grid cap, and a capacitor connected between said grid cap and said anode, said capacitor being enclosed in an electrically conducting can connected to said cathode.

8. An electronic time-delay circuit comprising a voltage amplifier including a vacuum tube having a cathode, a control grid with a grid cap connected thereto, and an anode, said vacuum tube being of the glass envelope type with the grid cap located on the glass envelope, a guard ring surrounding said grid cap and connected to said cathode, a resistor connected at one of its terminals to said grid cap, and a capacitor connected between said grid cap and said anode.

9. An electronic time-delay circuit comprising a voltage amplifier including a vacuum tube having a cathode, a control grid with a grid cap connected thereto, and an anode, said vacuum tube being of the glass envelope type with the grid cap located on the glass envelope, a guard ring of electrically conducting material on the surface of the glass envelope surrounding said grid cap, said guard ring being connected to said cathode, a resistor connected at one of its terminals to said grid cap, and a capacitor connected between said grid cap and said anode, said capacitor having an electrically conducting member secured thereto between its terminals, said conducting member being separated from the terminals of said capacitor and being connected to said cathode.

10. An electronic time-delay circuit comprising a voltage amplifier including a vacuum tube having a cathode, a control grid with a grid cap connected thereto, and an anode, said vacuum tube being of the glass envelope type with the grid cap located on the glass envelope, a guard ring of electrically conducting material on the surface of the glass envelope surrounding said grid cap, said guard ring being connected to said cathode, a resistor connected at one of its terminals to said grid cap, and a capacitor connected between said grid cap and said anode, said capacitor being enclosed in an electrically conducting can connected to said cathode.

CHARLES W. CLAPP.

REFERENCES CITED

The following references are of record in the file of this patent:

UNITED STATES PATENTS

| Number | Name | Date |
|---|---|---|
| 2,412,485 | Whiteley | Dec. 10, 1946 |

FOREIGN PATENTS

| Number | Country | Date |
|---|---|---|
| 580,527 | Great Britain | Sept. 11, 1946 |